(12) United States Patent
Zhou (10) Patent No.: US 12,365,385 B2
(45) Date of Patent: Jul. 22, 2025

(54) VEHICLE DRIFT CONTROL METHOD AND APPARATUS, VEHICLE, STORAGE MEDIUM AND CHIP

(71) Applicant: Xiaomi EV Technology Co., Ltd., Beijing (CN)

(72) Inventor: Xingchen Zhou, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 194 days.

(21) Appl. No.: 18/326,641

(22) Filed: May 31, 2023

(65) Prior Publication Data

US 2024/0182108 A1  Jun. 6, 2024

(30) Foreign Application Priority Data

Dec. 1, 2022  (CN) .......................... 202211529444.5

(51) Int. Cl.
*B62D 6/00* (2006.01)
*B60W 10/18* (2012.01)
(Continued)

(52) U.S. Cl.
CPC ............. *B62D 6/006* (2013.01); *B60W 10/18* (2013.01); *B60W 10/20* (2013.01);
(Continued)

(58) Field of Classification Search
CPC ....... B62D 6/006; B60W 10/18; B60W 10/20; B60W 40/101; B60W 40/114;
(Continued)

(56) References Cited

U.S. PATENT DOCUMENTS 9,604,670 B2 * 3/2017 Taniguchi ................ B62D 6/04
10,773,708 B2 * 9/2020 Ruybal .................... B60K 6/52
(Continued)

FOREIGN PATENT DOCUMENTS

CN  114084140 A    2/2022
CN  115123243 A *  9/2022
(Continued)

OTHER PUBLICATIONS

Extended European Search Report issued on Nov. 23, 2023 for European Patent Application No. 23176478.8.

*Primary Examiner* — Jelani A Smith
*Assistant Examiner* — Dana D Ivey
(74) *Attorney, Agent, or Firm* — Volpe Koenig (57) ABSTRACT

A method, device, and computer readable medium for controlling drift of a vehicle. The drift of the vehicle is controlled by acquiring a slip rate level and steering information of the vehicle in a drift mode opening state; determining a target drift parameter according to the slip rate level, the steering information and a current vehicle velocity, the target drift parameter includes a target yaw rate; determining a steering compensation quantity according to a current actual yaw rate and the target yaw rate; determining front axle torque, rear axle torque and rear wheel brake torque according to the steering compensation quantity and the steering information; and controlling the vehicle to drift travelling according to the front axle torque, the rear axle torque and the rear wheel brake torque, and controlling a power-assisted steering motor to perform steering compensation according to the steering compensation quantity and the vehicle velocity.

18 Claims, 4 Drawing Sheets

(51) Int. Cl.
  *B60W 10/20* (2006.01)
  *B60W 40/101* (2012.01)
  *B60W 40/114* (2012.01)
  *B60W 50/14* (2020.01)
  *B60K 6/52* (2007.10)
  *B60W 10/04* (2006.01)
  *B60W 10/14* (2012.01)
  *B60W 30/045* (2012.01)
  *B60W 30/18* (2012.01)
  *B60W 30/182* (2020.01)
  *B60W 40/103* (2012.01)
  *B60W 50/00* (2006.01)

(52) U.S. Cl.
  CPC ........ *B60W 40/101* (2013.01); *B60W 40/114* (2013.01); *B60W 50/14* (2013.01); *B60K 6/52* (2013.01); *B60W 10/04* (2013.01); *B60W 10/14* (2013.01); *B60W 30/045* (2013.01); *B60W 30/18072* (2013.01); *B60W 30/18145* (2013.01); *B60W 30/182* (2013.01); *B60W 40/103* (2013.01); *B60W 2050/0011* (2013.01); *B60W 2510/20* (2013.01); *B60W 2520/10* (2013.01); *B60W 2520/14* (2013.01); *B60W 2520/26* (2013.01); *B60W 2540/18* (2013.01); *B60W 2540/215* (2020.02); *B60W 2540/30* (2013.01); *B60W 2710/18* (2013.01); *B60W 2710/20* (2013.01); *B60W 2710/207* (2013.01); *B60W 2720/14* (2013.01); *Y02T 10/72* (2013.01)

(58) Field of Classification Search
  CPC ......... B60W 50/14; B60W 2050/0011; B60W 2520/10; B60W 2520/14; B60W 2520/263; B60W 2540/18; B60W 2540/215; B60W 2540/30; B60W 2710/207; B60W 2720/14; B60W 2720/403; B60W 10/04; B60W 30/045; B60W 30/18145; B60W 30/182; B60W 40/103; B60W 30/18072; B60W 10/14; B60W 2510/20; B60W 2710/18; B60K 6/52; Y02T 10/72
  USPC ........................................................ 701/42
  See application file for complete search history.

(56) References Cited

U.S. PATENT DOCUMENTS

| | | | |
|---|---|---|---|
| 11,383,727 B2* | 7/2022 | Niesen | B60W 30/10 |
| 2008/0217099 A1* | 9/2008 | Reungwetwattana | B62D 5/0472 180/446 |
| 2011/0029200 A1 | 2/2011 | Shah | |
| 2014/0343790 A1 | 11/2014 | Hestermeyer et al. | |
| 2018/0257631 A1 | 9/2018 | Fodor et al. | |
| 2019/0202497 A1* | 7/2019 | Hajika | G05B 6/02 |

FOREIGN PATENT DOCUMENTS

| | | |
|---|---|---|
| DE | 102008029894 B4 | 4/2018 |
| FR | 2899189 A | 10/2007 |
| JP | 2010-188933 A | 9/2010 |
| JP | 2010-025272 A | 2/2020 |
| WO | 2022/048267 A1 | 3/2022 |

* cited by examiner

VEHICLE DRIFT CONTROL METHOD AND APPARATUS, VEHICLE, STORAGE MEDIUM AND CHIP

CROSS REFERENCE TO RELATED APPLICATIONS

The disclosure is provided based on and claims priority to the Chinese Patent Application No. 202211529444.5, filed on Dec. 1, 2022, the entire contents of which are incorporated herein by reference.

BACKGROUND

Vehicle drift depends on the driver's proficiency in joint operation of an accelerator, steering, brake, etc.

SUMMARY

The disclosure provides a vehicle drift control method and apparatus, a vehicle, a storage medium and a chip.

According to a first aspect of examples of the disclosure, a vehicle drift control method is provided, including:
- acquiring a slip rate level and steering information of a vehicle in a drift mode opening state of the vehicle;
- determining a target drift parameter according to the slip rate level, the steering information and a current vehicle velocity of the vehicle, the target drift parameter includes a target yaw rate;
- determining a steering compensation quantity according to a current actual yaw rate of the vehicle and the target yaw rate;
- determining front axle torque, rear axle torque and rear wheel brake torque of the vehicle according to the steering compensation quantity and the steering information; and
- controlling the vehicle to drift travelling according to the front axle torque, the rear axle torque and the rear wheel brake torque, and controlling a power-assisted steering motor to perform steering compensation according to the steering compensation quantity and the current vehicle velocity in the drift travelling process.

According to a second aspect of the examples of the disclosure, a vehicle is provided, including:
- a processor; and
- a memory configured to store an executable instruction of the processor; where
the processor is configured to:
- acquire a slip rate level and steering information of a vehicle in a drift mode opening state of the vehicle;
- determine a target drift parameter according to the slip rate level, the steering information and a current vehicle velocity of the vehicle, the target drift parameter includes a target yaw rate;
- determine a steering compensation quantity according to a current actual yaw rate of the vehicle and the target yaw rate;
- determine front axle torque, rear axle torque and rear wheel brake torque of the vehicle according to the steering compensation quantity and the steering information; and
- control the vehicle to drift travelling according to the front axle torque, the rear axle torque and the rear wheel brake torque, and control a power-assisted steering motor to perform steering compensation according to the steering compensation quantity and the current vehicle velocity in the drift travelling process.

According to a third aspect of the examples of the disclosure, a non-transitory computer readable storage medium is provided, on which a computer program instruction is stored, and when the program instruction is executed by a processor, steps of any one of methods in the first aspect are achieved.

According to a fourth aspect of the examples of the disclosure, a chip is provided, including a processor and an interface, where the processor is configured to read an instruction to execute any one of methods in the first aspect.

It will be noted that general descriptions above and detailed descriptions below are merely for example and illustrative, which may not limit the disclosure.

BRIEF DESCRIPTION OF THE DRAWINGS

The accompanying drawings here are incorporated into and form part of the specification, show examples that comply with the disclosure, and are configured to explain the principle of the disclosure in conjunction with the specification.

DETAILED DESCRIPTION

Examples will be illustrated in detail here, and their instances are shown in the accompanying drawings. When the descriptions below refer to the accompanying drawings, the same numbers in different accompanying drawings indicate the same or similar elements unless otherwise indicated. Implementation modes described in the examples below do not represent all implementation modes consistent with the disclosure. On the contrary, they are merely examples of apparatuses and methods that are consistent with some aspects of the disclosure, as detailed in the attached claims.

In the related art, since a front axle and a rear axle may both output torque, a torque proportion may not be freely adjusted, and when a side acceleration is relatively large, because of lateral load transfer of a vehicle, a vertical load of an inner wheel is reduced, and the tire force is reduced, which easily breaks the road limit and skids. Since a differential mechanism is in velocity going down and force staying the same, rear axle drive torque is reduced, which makes it difficult for the vehicle to achieve drift.

As for this, the disclosure provides a technical solution related to the field of vehicle control, and in particular to a vehicle drift control method and apparatus, a vehicle, a storage medium, and a chip.

Figure 1:
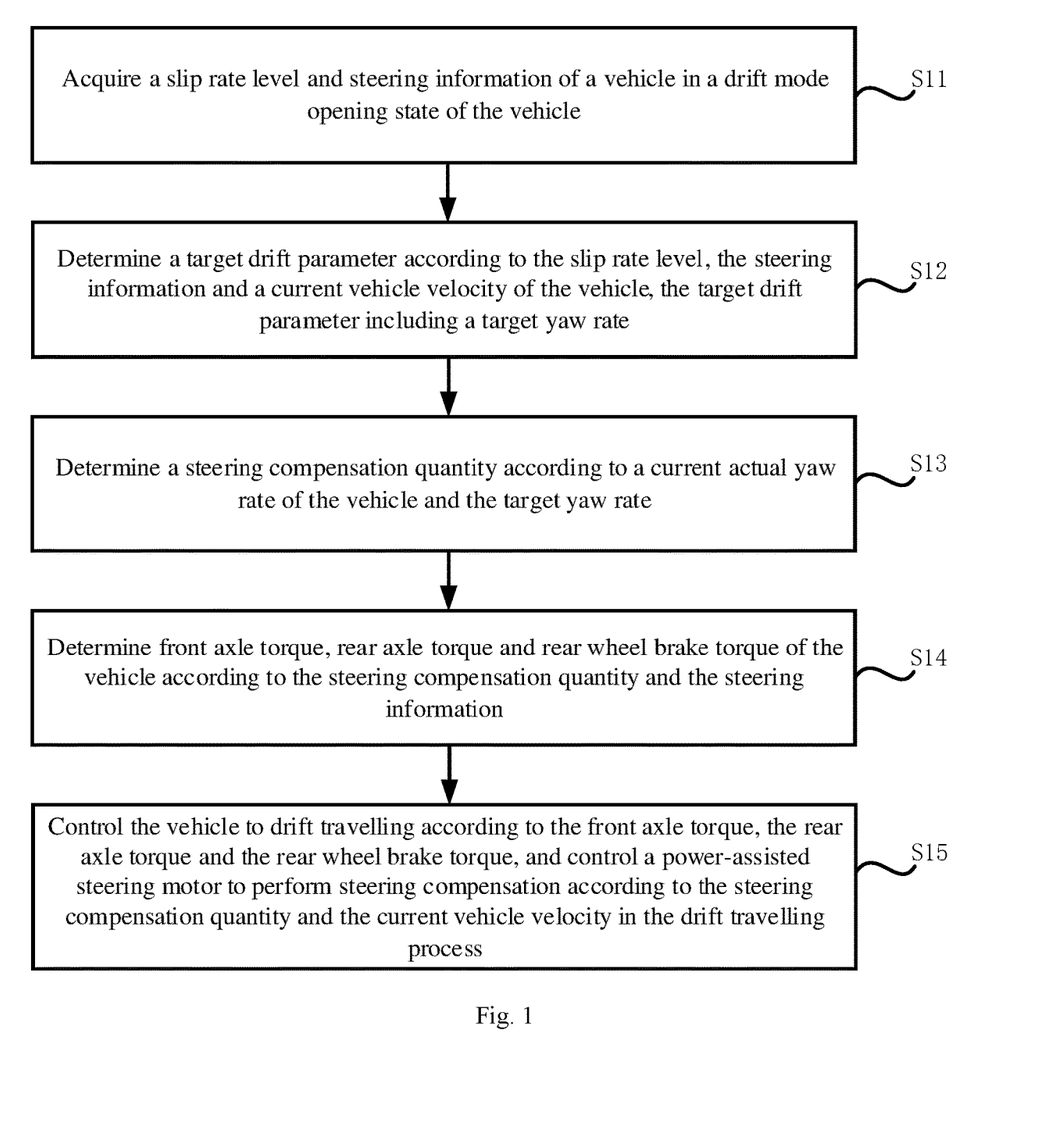
FIG. 1 is a flow diagram of a vehicle drift control method shown according to an example.

FIG. 1 is a flow diagram of a vehicle drift control method shown according to an example, and the method may be performed by a whole vehicle central domain controller, as shown in FIG. 1, including the following steps.

In step S11, a slip rate level and steering information of a vehicle in a drift mode opening state of the vehicle are acquired.

In the example of the disclosure, a physical drift mode opening switch may be arranged in a center console in a cab or other positions, and a virtual drift mode opening button may also be arranged on a center control display screen, so that a driver may manually open a drift mode. Similarly, a slip rate level switch may also be arranged, and the slip rate level may be manually selected through the slip rate level switch. For example, 5 levels of slip rates may be set. Vehicle drift velocities, vehicle drift angles, etc. corresponding to different levels of slip rates are all different.

In the example of the disclosure, the drift mode of the vehicle enters a standby state when the drift mode opening switch is turned on, such that the slip rate level and the steering information of the vehicle are acquired, and the drift mode of the vehicle enters in an active state in a case that a final vehicle velocity, a steering angle, etc. meet a corresponding condition.

In step S12, a target drift parameter is determined according to the slip rate level, the steering information, and a current vehicle velocity of the vehicle, and the target drift parameter includes a target yaw rate.

In the example of the disclosure, the vehicle velocity of the vehicle may be collected through a gyroscope or inertial measurement unit.

Figure 2:
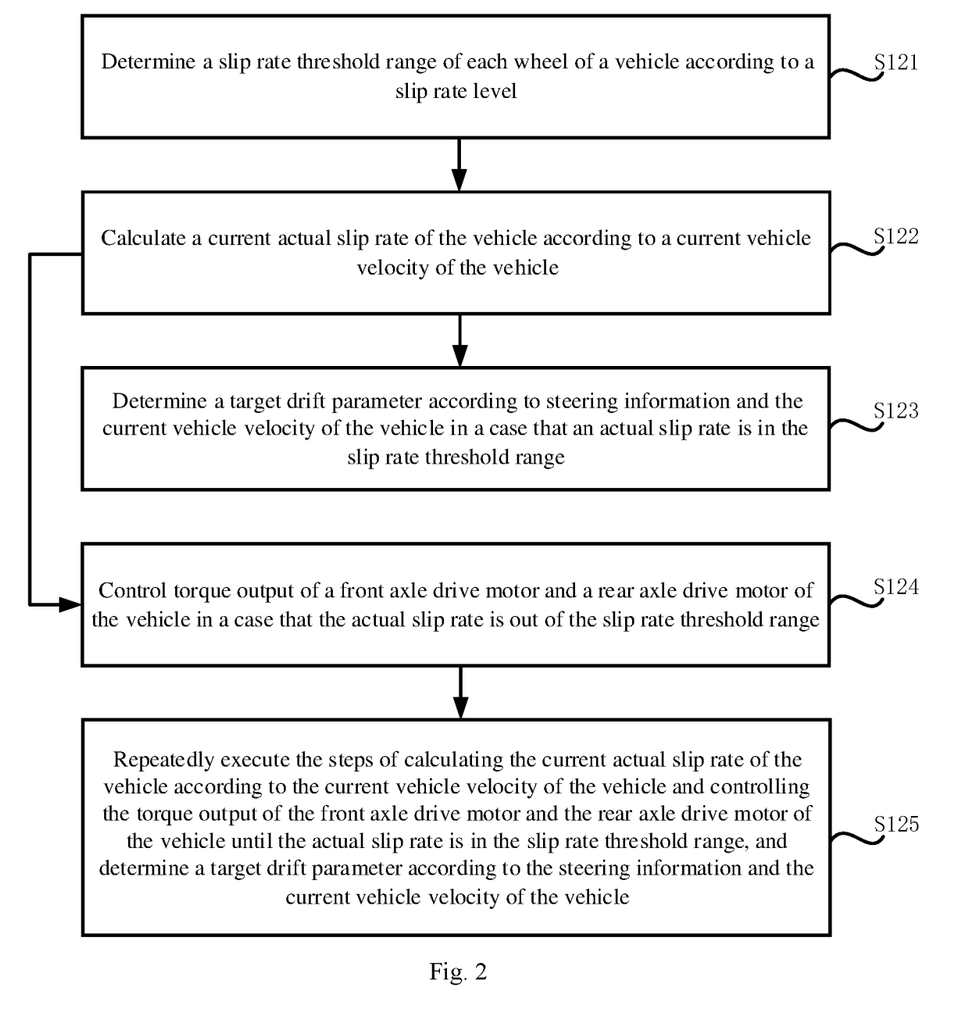
FIG. 2 is a flow diagram for implementing step S12 in FIG. 1 shown according to an example.

In one implementation mode of the disclosure, referring to FIG. 2, in step S12, the step of determining the target drift parameter according to the slip rate level, the steering information and the current vehicle velocity of the vehicle may include:
  in step S121, a slip rate threshold range of each wheel of the vehicle is determined according to the slip rate level.

In the example of the disclosure, different slip rate levels have a one-to-one correspondence relation with the slip rate threshold ranges, the greater a slip rate threshold value in the slip rate threshold range, the greater the vehicle velocity of the vehicle in drift travelling, and the smaller the slip rate threshold value in the slip rate threshold range, the smaller the vehicle velocity of the vehicle in drift travelling.

It is worth noting that a reason why the slip rate threshold range here is a range is that the vehicle may realize drift just when the vehicle reaches a large enough velocity, and it may be understood that different slip rate levels are supposed to correspond to a minimum slip rate threshold and a maximum slip rate threshold in vehicle drift.

In step S122, a current actual slip rate of the vehicle is calculated according to the current vehicle velocity of the vehicle.

It may be understood that the actual slip rate S may be calculated through the following formula:

$$S=(u-r\times w)/u$$

u is the current vehicle velocity of the vehicle, w is a rolling radius of the wheels of the vehicle, and r is radii of the wheels of the vehicle.

In step S123, a target drift parameter is determined according to the steering information and the current vehicle velocity of the vehicle in the case that the actual slip rate is in the slip rate threshold range.

In the example of the disclosure, the target drift parameter is determined according to the steering information and the current vehicle velocity of the vehicle in the case that the actual slip rate is in the slip rate threshold range. For example, the actual slip rate is greater than or equal to a minimum slip rate threshold range and less than or equal to a maximum slip rate threshold range.

In the example of the disclosure, a corresponding relation among the steering information, the vehicle velocity and the drift parameter under each slip rate level is pre-calibrated, and the target drift parameter further includes at least one of a target rear axle side slip angle, a target front axle slip rate, a target rear axle slip rate or a target wheel velocity.

For example, a corresponding relation between the slip rate level and the slip rate threshold range is pre-calibrated. In some instances, a corresponding relation among the steering information, the vehicle velocity and the drift parameter under each slip rate level is calibrated, a look-up table is obtained, and then in an actual drift control process, the table is looked up according to the slip rate level, the steering information and the vehicle velocity in real time, so as to obtain a target drift parameter corresponding to each moment.

Alternatively, the vehicle drift control method includes:
  in step S124, torque output of a front axle drive motor and a rear axle drive motor is controlled in the case that the actual slip rate is out of the slip rate threshold range.

Here, the torque output of the front axle drive motor and the rear axle drive motor of the vehicle is controlled to be increased in the case that the actual slip rate is smaller than the minimum slip rate threshold range, and the torque output of the front axle drive motor and the rear axle drive motor of the vehicle is controlled to be decreased in the case that the actual slip rate is greater than the maximum slip rate threshold range.

In step S125, the steps of calculating the current actual slip rate of the vehicle according to the current vehicle velocity of the vehicle and controlling the torque output of the front axle drive motor and the rear axle drive motor of the vehicle are repeatedly executed until the actual slip rate is in the slip rate threshold range, and the target drift parameter is determined according to the steering information and the current vehicle velocity of the vehicle.

In step S13, a steering compensation quantity is determined according to the current actual yaw rate of the vehicle and the target yaw rate.

In the example of the disclosure, the actual yaw rate may be determined through a gyroscope or inertial measurement unit arranged on the vehicle. For example, time integration is performed on an angle collected by the gyroscope or inertial measurement unit to determine the current actual yaw rate of the vehicle.

In the example of the disclosure, in the drift travelling process of the vehicle, according to an actual response of the vehicle. For example, the actual yaw rate, closed-loop control is performed through a proportional integral differential (PID) algorithm.

Figure 3:
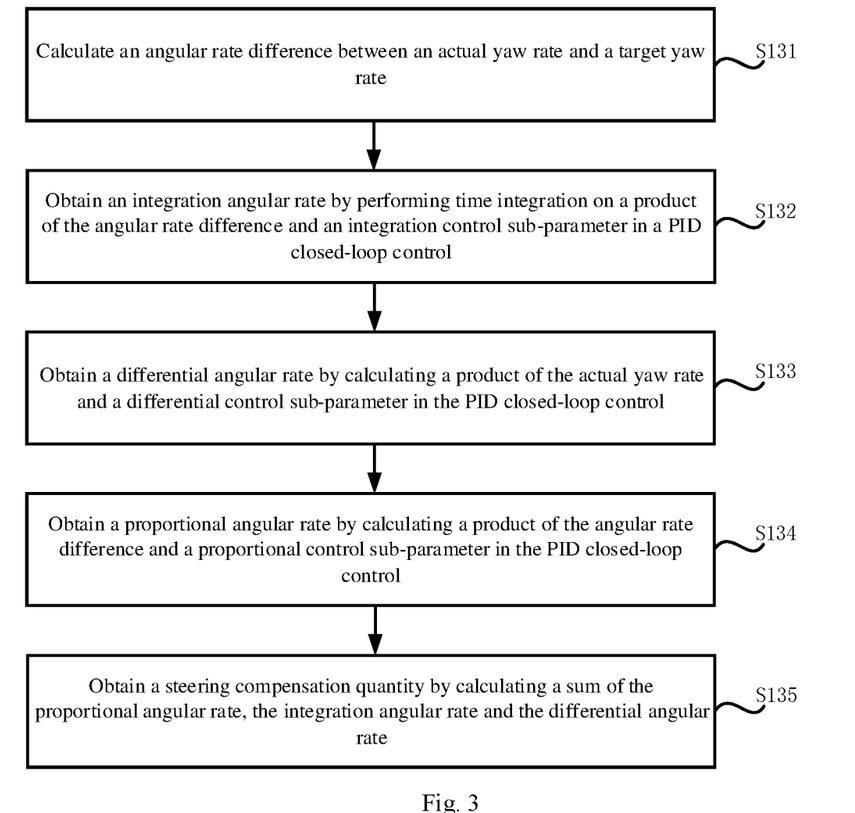
FIG. 3 is a flow diagram for implementing step S13 in FIG. 1 shown according to an example.

In an implementation mode, referring to FIG. 3, in step S13, the step of determining the steering compensation quantity according to the current actual yaw rate of the vehicle and the target yaw rate includes:
  in step S131, an angular rate difference between the actual yaw rate and the target yaw rate is calculated;
  in step S132, an integration angular rate is obtained by performing time integration on a product of the angular rate difference and an integration control sub-parameter in a PID closed-loop control;
  in step S133, a differential angular rate is obtained by calculating a product of the actual yaw rate and a differential control sub-parameter in the PID closed-loop control;

in step S134, a proportional angular rate is obtained by calculating a product of the angular rate difference and a proportional control sub-parameter in the PID closed-loop control; and in step S135, the steering compensation quantity is obtained by calculating a sum of the proportional angular rate, the integration angular rate and the differential angular rate.

In the example of the disclosure, the steering compensation quantity dMz may be determined through a following formula:

$$dMz = \Delta Yawrate \times P + \int_0^t \Delta Yawrate \times I \times dt + Yawrate \times D$$

ΔYawrate is the angular rate difference between the actual yaw rate and the target yaw rate, P is the differential control sub-parameter in the PID closed-loop control, I is the proportional control sub-parameter in the PID closed-loop control, dt is the integration on time t, Yawrate is the actual yaw rate, and D is the proportional control sub-parameter in the PID closed-loop control.

It may be illustrated that if the actual yaw rate is subtracted from the target yaw rate to obtain the angular rate difference, it represents that the current steering angle of the vehicle is insufficient in the case that the steering compensation quantity obtained through calculation is minus, and it represents that the current steering angle of the vehicle is excessive in the case that the steering compensation quantity obtained through the calculation is plus.

In step S14, front axle torque, rear axle torque and rear wheel brake torque of the vehicle are determined according to the steering compensation quantity and the steering information.

The front axle torque and the rear axle torque may be proportionally distributed in an initial state. For example, the front axle torque and the rear axle torque may be distributed at 1:4 in the initial state, and then the proportional distribution of the front axle torque and the rear axle torque of the vehicle at each moment in the closed-loop control is determined according to the steering compensation quantity and the steering information.

Figure 4:
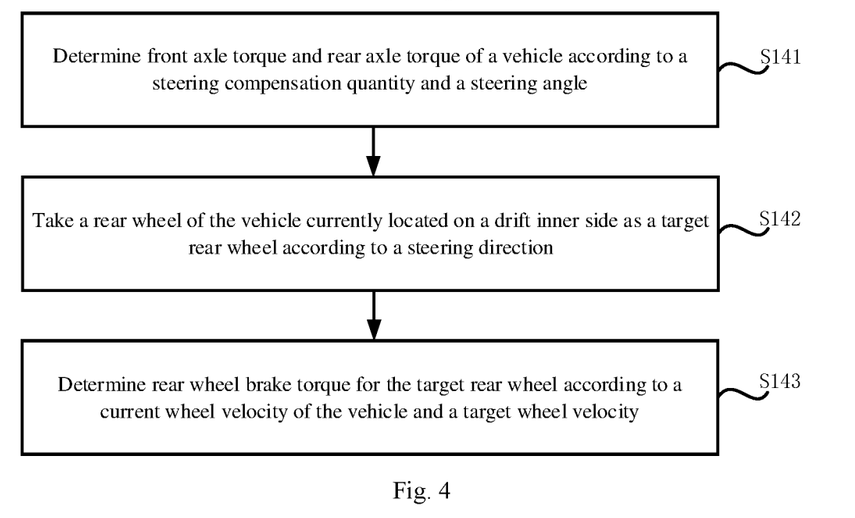
FIG. 4 is a flow diagram for implementing step S14 in FIG. 1 shown according to an example.

Alternatively, the steering information includes an actual steering angle and a steering direction, the target drift parameter includes a target wheel velocity, and correspondingly, referring to FIG. 4, the step of determining the front axle torque, the rear axle torque and the rear wheel brake torque of the vehicle according to the steering compensation quantity and the steering information includes:

In step S141, the front axle torque and the rear axle torque of the vehicle are determined according to the steering compensation quantity and the steering angle.

In the example of the disclosure, a torque distribution proportion of the front axle torque and the rear axle torque is determined according to the steering compensation quantity and the steering angle, and then the front axle torque and the rear axle torque of the vehicle are determined according to total motor torque and the torque distribution proportion.

In step S142, a rear wheel of the vehicle currently located on a drift inner side is taken as a target rear wheel according to the steering direction.

It needs to be illustrated that in the case of vehicle drift steering, a vertical load of the rear wheel of the vehicle turning inside is small, a road holding limit of a tire of the rear wheel is low, and if the drive torque provided by the rear axle drive motor is greater, the wheel easily slips, and loses rear axle drive force, possibly resulting in a vehicle drift travelling failure. As a result, the rear wheel of the vehicle currently located on the drift inner side is taken as the target rear wheel according to the steering direction of vehicle drift travelling, and a brake limit is performed on the target rear wheel.

In step S143, rear wheel brake torque for the target rear wheel is determined according to the current wheel velocity of the vehicle and the target wheel velocity.

In the example of the disclosure, the rear wheel brake torque for the target rear wheel is determined according to a wheel velocity difference between the current wheel velocity of the vehicle and the target wheel velocity, brake output is performed through a brake system like brake calipers of the vehicle, and then the rear wheel brake torque is continuously calculated under the PID closed-loop control.

The rear wheel brake torque for the target rear wheel is determined according to the current wheel velocity and the target wheel velocity in the above technical solution, the target rear wheel may recover the rear axle drive force after brake intervention is increased, and a probability of the vehicle drift travelling failure is reduced.

In step S15, drift travelling of the vehicle is controlled according to the front axle torque, the rear axle torque and the rear wheel brake torque, and a power-assisted steering motor is controlled to perform steering compensation according to the steering compensation quantity and the current vehicle velocity in the drift travelling process.

In an implementation mode, a coefficient of road adhesion is estimated, then, a front axle torque limit threshold is calculated according to the coefficient of road adhesion and a front axle target slip rate, and the front axle torque is limited in a range of the front axle torque limit threshold, so that the front axle torque is greater than a minimum value of the front axle torque limit threshold and less than a maximum value of the front axle torque limit threshold.

Alternatively, the step of controlling drift travelling of the vehicle according to the front axle torque, the rear axle torque and the rear wheel brake torque includes:

the front axle drive motor of the vehicle is controlled to provide the front axle torque for the front wheel, the rear axle drive motor of the vehicle is controlled to provide the rear axle torque for the rear wheel, and the brake system of the vehicle is controlled to provide the rear wheel brake torque for the target rear wheel, so as to control the vehicle to drift travelling.

In the example of the disclosure, a corresponding relation among the steering compensation quantity, the vehicle velocity and the target steering torque is pre-calibrated to obtain a power-assisted steering table, then, current target steering torque is obtained by looking up the table according to the steering compensation quantity and the vehicle velocity, and the power-assisted steering motor is controlled to perform steering compensation according to the target steering torque.

For example, when the vehicle rotates a steering wheel to the left and drifts, if the steering is excessive, an angle corresponding to a right-turn steering compensation quantity is requested; when the vehicle rotates the steering wheel to the left and drifts, if the steering is insufficient, an angle corresponding to a left-turn steering compensation quantity is requested; when the vehicle rotates the steering wheel to the right and drifts, if the steering is excessive, the angle corresponding to the left-turn steering compensation quantity is requested; and when the vehicle rotates the steering wheel to the right and drifts, if the steering is insufficient, the angle corresponding to the right-turn steering compensation quantity is requested, and the power-assisted steering motor of the vehicle performs execution.

It may be illustrated that assuming that at a certain initial vehicle velocity, the driver rotates the steering wheel to the left and treadles an opening degree of an accelerator pedal to 100%, when the rear axle slip rate of the vehicle is in the slip rate threshold range and the actual yaw rate meets the target yaw rate, the drift mode of the vehicle enters in the active state, closed-loop control is performed with the target yaw rate, the distribution of the front axle torque and the rear axle torque is calculated by calculating the steering compensation quantity at each moment of output, and the front axle torque is input to the front axle drive motor to limit the torque magnitude; and the rear axle torque is input to the rear axle drive motor, and then the rear wheel torque is limited according to the target slip rate and target yaw rate. Then the front axle drive motor and the rear axle drive motor execute the torque to assist the driver in performing drift control; and meanwhile, brake control over the target rear wheel is performed, the PID closed-loop control is performed through the difference between the actual wheel velocity and the target wheel velocity to output the brake torque, and the slip wheel velocity of the target rear wheel is reduced, so that the drive torque will not be reduced because of wheel slip.

The above technical solution acquires the slip rate level and the steering information of the vehicle in the drift mode opening state of the vehicle; determines the target drift parameter according to the slip rate level, the steering information and the current vehicle velocity of the vehicle, the target drift parameter includes the target yaw rate; determines the steering compensation quantity according to the current actual yaw rate and the target yaw rate of the vehicle; determines the front axle torque, the rear axle torque and the rear wheel brake torque of the vehicle according to the steering compensation quantity and the steering information; and controls the vehicle to drift travelling according to the front axle torque, the rear axle torque and the rear wheel brake torque, and controls the power-assisted steering motor to perform steering compensation according to the steering compensation quantity and the current vehicle velocity in the drift travelling process. As a result, dependency of vehicle drift on the driver is reduced, different drift parameters may further be determined according to different steering and velocities of the vehicle, and drift in different states is achieved.

Alternatively, before the step of controlling the power-assisted steering motor to perform steering compensation according to the steering compensation quantity and the current vehicle velocity, the method includes:

the steering angle difference between the actual steering angle in the steering information and the target steering angle in the target drift parameter is calculated, and it is determined that the steering angle difference is in the preset steering compensation threshold range.

In the example of the disclosure, in the case that the steering angle difference is greater than the minimum value of the preset steering compensation threshold and less than the maximum value of the preset steering compensation threshold, the power-assisted steering motor is controlled to perform steering compensation according to the steering compensation quantity and the current vehicle velocity. For example, the preset steering compensation threshold range may be ±3°, in other words, in the case that the steering angle difference is greater than −3°, and less than 3°, the power-assisted steering motor is controlled to perform steering compensation according to the steering compensation quantity and the current vehicle velocity.

Correspondingly, the vehicle drift control method further includes:

an extremum with a smaller first difference from the steering angle difference is selected from the preset steering compensation threshold range to serve as the target extremum in the case of determining that the steering angle difference is not in the preset steering compensation threshold range.

It is illustrated by following the above example that if the steering angle difference is 5° and the extremum 3° is the one with the smaller first difference from the steering angle difference in the preset steering compensation threshold range, 3° is taken as the target extremum.

The second difference between the steering angle difference and the target extremum is calculated.

The steering prompting information used for prompting the driver to perform steering operation is generated according to the value of the second difference and plus or minus of the second difference, so as to prompt the driver to perform steering according to the steering prompting information until it is determined that the steering angle difference is in the preset steering compensation threshold range.

It may be illustrated that the minus or plus of the second difference is used for representing a direction of the steering operation, and the value of the second difference is used for representing an angle of the steering operation. It is illustrated by following the above example that the second difference between the steering angle difference 5° and the target extremum 3° is 2°, it is illustrated that the actual steering angle is greater than the target steering angle, an angle of the actual steering angle greater than the target steering angle exceeds the maximum value of the steering angle capable of being adjusted by the power-assisted motor by 2°, and the driver needs to rotate the steering wheel by at least 2°, so that the steering prompting information may be displayed on a central control instrument of the vehicle, or broadcast prompting is performed through voices.

According to the above technical solution, when the actual steering angle and the target steering angle are larger, the driver needs to assist in steering, the power-assisted motor performs compensation on steering merely at a small angle, if steering is compensated at a large angle, the driver cannot predict a steering radian and a drift radian, as a result, the driver considers that the vehicle is out of control and performs steering operation under confusion, and safety of vehicle drift traveling is affected.

Figure 5:
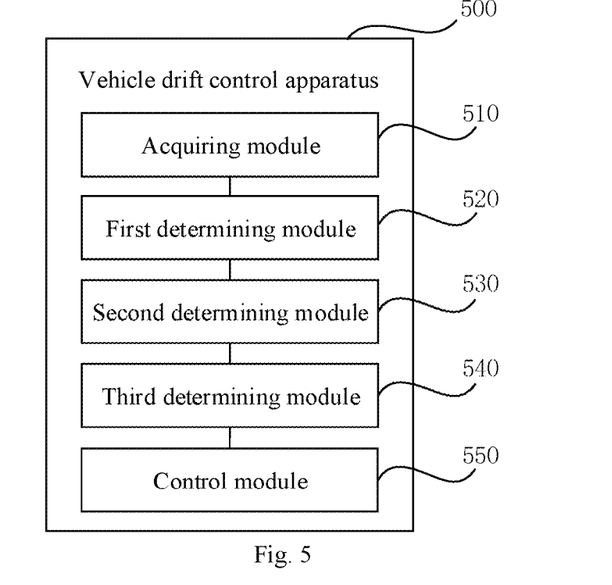
FIG. 5 is a block diagram of a vehicle drift control apparatus shown according to an example.

Based on the same conception, an example of the disclosure further provides a vehicle drift control apparatus, and referring to FIG. 5, the vehicle drift control apparatus 500 includes an acquiring module 510, a first determining module 520, a second determining module 530, a third determining module 540 and a control module 550.

The acquiring module 510 is configured to acquire a slip rate level and steering information of a vehicle in a drift mode opening state of the vehicle;

the first determining module 520 is configured to determine a target drift parameter according to the slip rate level, the steering information and a current vehicle velocity of the vehicle, and the target drift parameter includes a target yaw rate;

the second determining module 530 is configured to determine a steering compensation quantity according to a current actual yaw rate of the vehicle and the target yaw rate;

the third determining module 540 is configured to determine front axle torque, rear axle torque and rear wheel brake torque of the vehicle according to the steering compensation quantity and the steering information; and the control module 550 is configured to control the vehicle to drift travelling according to the front axle torque, the rear axle torque and the rear wheel brake torque, and control a power-assisted steering motor to perform steering compensation according to the steering compensation quantity and the current vehicle velocity in the drift travelling process.

The vehicle drift control apparatus of the disclosure reduces the dependency of the vehicle drift on a driver, may further determine different drift parameters according to different steering and velocities of the vehicle, and may achieve drift in different states.

Alternatively, the first determining module 520 is configured to:
determine a slip rate threshold range of each wheel of the vehicle according to the slip rate level;
calculate a current actual slip rate of the vehicle according to the current vehicle velocity of the vehicle; and
determine the target drift parameter according to the steering information and the current vehicle velocity of the vehicle in the case that the actual slip rate is in the slip rate threshold range.

Alternatively, the first determining module 520 is configured to:
control torque output of a front axle drive motor and a rear axle drive motor of the vehicle in the case that the actual slip rate is out of the slip rate threshold range; and
repeatedly execute the steps of calculating the current actual slip rate of the vehicle according to the current vehicle velocity of the vehicle and controlling the torque output of the front axle drive motor and the rear axle drive motor of the vehicle until the actual slip rate is in the slip rate threshold range, and determine the target drift parameter according to the steering information and the current vehicle velocity of the vehicle.

Alternatively, the target drift parameter further includes at least one of a target rear axle side slip angle, a target front axle slip rate, a target rear axle slip rate or a target wheel velocity.

Alternatively, the steering information includes an actual steering angle and a steering direction, the target drift parameter includes the target wheel velocity, and the third determining module 540 is configured to:
determine the front axle torque and the rear axle torque of the vehicle according to the steering compensation quantity and the steering angle;
take a rear wheel of the vehicle currently located on a drift inner side as a target rear wheel according to the steering direction; and
determine the rear wheel brake torque for the target rear wheel according to the current wheel velocity of the vehicle and the target wheel velocity.

Alternatively, the control module 550 is configured to:
control the front axle drive motor of the vehicle to provide the front axle torque for a front wheel, control the rear axle drive motor of the vehicle to provide the rear axle torque for a rear wheel, and control a brake system of the vehicle to provide the rear wheel brake torque for the target rear wheel, so as to control the vehicle to drift travelling.

Alternatively, the control module 550 is configured to calculate a steering angle difference between the actual steering angle in the steering information and the target steering angle in the target drift parameter before the step of controlling the power-assisted steering motor to perform steering compensation according to the steering compensation quantity and the current vehicle velocity;
determine that the steering angle difference is in the preset steering compensation threshold range;
select an extremum with a smaller first difference from the steering angle difference from the preset steering compensation threshold range to serve as a target extremum in the case of determining that the steering angle difference is not in the preset steering compensation threshold range;
calculate a second difference between the steering angle difference and the target extremum; and
generate steering prompting information used for prompting a driver to perform steering operation according to a value of the second difference and plus or minus of the second difference, so as to prompt the driver to perform steering according to the steering prompting information until it is determined that the steering angle difference is in the preset steering compensation threshold range.

Alternatively, the second determining module 530 is configured to:
calculate an angular rate difference between the actual yaw rate and the target yaw rate;
obtain an integration angular rate by performing time integration on a product of the angular rate difference and an integration control sub-parameter in a PID closed-loop control;
obtain a differential angular rate by calculating a product of the actual yaw rate and a differential control sub-parameter in the PID closed-loop control;
obtain a proportional angular rate by calculating a product of the angular rate difference and a proportional control sub-parameter in the PID closed-loop control; and
obtain the steering compensation quantity by calculating a sum of the proportional angular rate, the integration angular rate and the differential angular rate.

As for the vehicle drift control apparatus 500 in the above example, a specific mode of operation executed by each module has been described in detail in the example of the method, which is not illustrated in detail here.

Those skilled in the art will understand that the above described apparatus example is merely illustrative. For example, module division is merely logic function division, in actual implementation, other division modes may exist. In some instances, a plurality of modules may be combined or may be integrated into one module, and in addition, the module illustrated as a separation part may be or may also not be physically separated. Moreover, all the modules may be completely or partly achieved through software, hardware, firmware, or any their combination. When the software is used for achieving, the modules may be completely or partly achieved in a computer program product form. When the hardware is used for achieving, the modules may be completely or partly achieved in a form of an integrated circuit or a chip.

An example of the disclosure further provides a vehicle, including:
a processor; and
a memory configured to store an executable instruction of the processor; where
the processor is configured to:
acquire a slip rate level and steering information of the vehicle in a drift mode opening state of the vehicle;
determine a target drift parameter according to the slip rate level, the steering information and a current vehicle velocity of the vehicle, the target drift parameter includes a target yaw rate;

determine a steering compensation quantity according to a current actual yaw rate of the vehicle and the target yaw rate;

determine front axle torque, rear axle torque and rear wheel brake torque of the vehicle according to the steering compensation quantity and the steering information; and control the vehicle to drift travelling according to the front axle torque, the rear axle torque and the rear wheel brake torque, and control a power-assisted steering motor to perform steering compensation according to the steering compensation quantity and the current vehicle velocity in the drift travelling process.

It may be illustrated that the processor in the example of the disclosure may execute the executable instruction stored in the memory, so as to achieve steps of any one of the vehicle drift control methods in the above example of the disclosure.

An example of the disclosure further provides a computer readable storage medium, on which a computer program instruction is stored, and when the program instruction is executed by a processor, steps of any one of the vehicle drift control methods in the above example are achieved.

An example of the disclosure further provides a chip, including a processor and an interface, where the processor is configured to read an instruction to execute any one of the vehicle drift control methods in the above example.

An example of the disclosure further provides an integrated circuit (IC) or a chip, the integrated circuit may be an IC and may also be an integration of a plurality of ICs, the chip may include but is not limited to following types: a graphics processing unit (GPU), a central processing unit (CPU), a field programmable gate array (FPGA), a digital signal processor (DSP), an application specific integrated circuit (ASIC), a system on chip (SOC), etc. The above integrated circuit or chip may be configured to execute an executable instruction (or code), so as to achieve the above vehicle drift control method. The executable instruction may be stored in the integrated circuit or chip and may also be obtained from other apparatus or devices. For example, the integrated circuit or chip includes a processor, a memory and an interface configured to communicate with other apparatus. The executable instruction may be stored in the memory, and when the executable instruction is executed by the processor, the above vehicle drift control method is achieved; or the integrated circuit or chip may receive the executable instruction through the interface and transmit the instruction to the processor to be executed so as to achieve the above vehicle drift control method.

Figure 6:
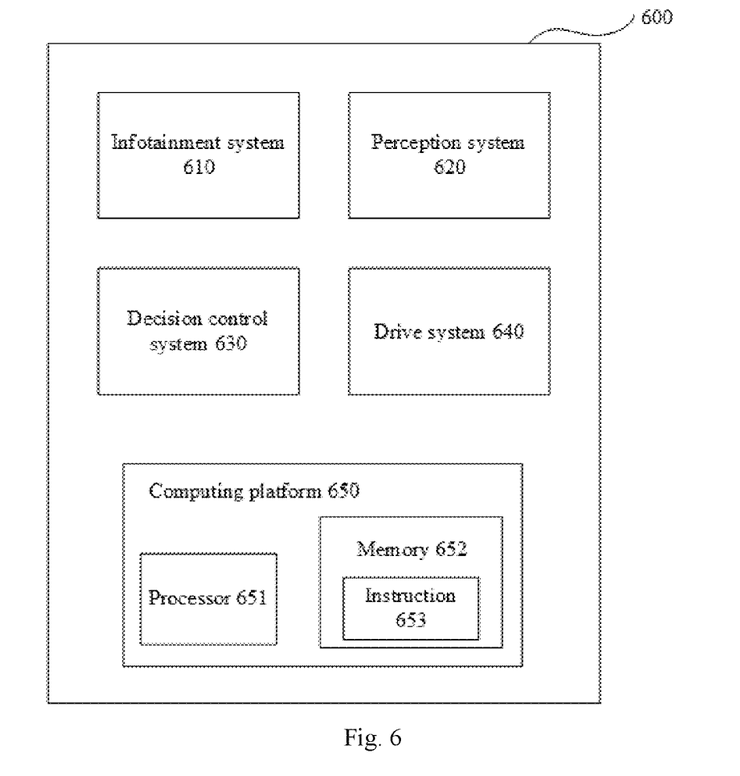
FIG. 6 is a schematic diagram of a functional block diagram of a vehicle shown according to an example.

FIG. 6 is a block diagram of a vehicle 600 shown according to an example. For example, the vehicle 600 may be a hybrid power vehicle and may also be a non-hybrid power vehicle, an electric vehicle, a fuel cell vehicle or other types of vehicles. The vehicle 600 may be an autonomous vehicle, a semi-autonomous vehicle or a non-autonomous vehicle.

Referring to FIG. 6, the vehicle 600 may include various subsystems, such as an infotainment system 610, a perception system 620, a decision control system 630, a drive system 640 and a computing platform 650. The vehicle 600 may further include more or less subsystems, and each sub-system may include a plurality of components. In addition, each subsystem and each component of the vehicle 600 may be connected in a wired or wireless mode.

In some examples, the infotainment system 610 may include a communication system, an entertainment system, a navigation system, etc.

The perception system 620 may include a plurality of sensors configured to sense information of a surrounding environment of the vehicle 600. For example, the perception system 620 may include a global positioning system (the global positioning system may be a GPS system and may also be a Beidou system or other positioning systems), an inertial measurement unit (IMU), a laser radar, a millimeter wave radar, an ultrasonic radar, and a camera apparatus.

The decision control system 630 may include a computing system, a vehicle controller, a steering system, a throttle and a brake system.

The drive system 640 may include an assembly providing power motion for the vehicle 600. In an example, the drive system 640 may include an engine, an energy source, a transmission system, and wheels. The engine may be one or a combination of an internal combustion engine, an electric motor, and an air compression engine. The engine may convert energy provided by the energy source into mechanical energy.

Part or all of functions of the vehicle 600 are controlled by the computing platform 650. The computing platform 650 may include at least one processor 651 and a memory 652, and the processor 651 may execute an instruction 653 stored in the memory 652.

The processor 651 may be any conventional processor, such as a commercially-available CPU. The processor may also include a graphics processing unit (GPU), a field programmable gate array (FPGA), a system on chip (SOC), an application specific integrated circuit (ASIC), or a combination of them.

The memory 652 may be implemented by any type of volatile or non-volatile memory device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc.

Besides the instruction 653, the memory 652 may also store data, such as a road map, route information, a vehicle location, direction and velocity and other data. The data stored in the memory 652 may be used by the computing platform 650.

In the example of the disclosure, the processor 651 may execute the instruction 653, so as to finish all or part of steps of the above vehicle drift control method.

After considering the specification and practice of the disclosure, those skilled in the art will easily think of other implementation solutions of the disclosure. The application is intended to cover any variation, use or adaptive changes of the disclosure, and the variation, use or adaptive changes follow a general principle of the disclosure and include common knowledge or a customary technical means in the technical field not disclosed in the disclosure. The specification and the examples are deemed for example merely, and the true scope and spirit of the disclosure are indicated by the claims below.

It will be understood that the disclosure is not limited to a precise structure already described above and shown in the accompanying drawings, various modifications and changes may be performed without departing the range of the disclosure, and the scope of the disclosure is merely limited by the attached claims.

What is claimed is:

1. A vehicle drift control method, comprising:
acquiring a slip rate level and steering information of a vehicle in a drift mode;

determining a target drift parameter according to the slip rate level, the steering information and a current vehicle velocity of the vehicle, the target drift parameter comprises a target yaw rate;

determining a steering compensation quantity according to a current actual yaw rate of the vehicle and the target yaw rate;

determining front axle torque, rear axle torque and rear wheel brake torque of the vehicle according to the steering compensation quantity and the steering information; and controlling the vehicle to drift according to the front axle torque, the rear axle torque and the rear wheel brake torque, and controlling a power-assisted steering motor to perform steering compensation according to the steering compensation quantity and the current vehicle velocity in the drift mode, wherein the steering information comprises an actual steering angle and a steering direction, the target drift parameter comprises a target wheel velocity, and determining the front axle torque, the rear axle torque and the rear wheel brake torque of the vehicle according to the steering compensation quantity and the steering information comprises:

determining the front axle torque and the rear axle torque of the vehicle according to the steering compensation quantity and the actual steering angle, taking a rear wheel of the vehicle currently located on a drift inner side as a target rear wheel according to the steering direction, and determining the rear wheel brake torque for the target rear wheel according to a current wheel velocity of the vehicle and the target wheel velocity.

2. The vehicle drift control method according to claim 1, wherein determining the target drift parameter according to the slip rate level, the steering information and the current vehicle velocity of the vehicle comprises:

determining a slip rate threshold range of each wheel of the vehicle according to the slip rate level;

calculating a current actual slip rate of the vehicle according to the current vehicle velocity of the vehicle; and determining the target drift parameter according to the steering information and the current vehicle velocity of the vehicle in a case that the current actual slip rate is in the slip rate threshold range.

3. The vehicle drift control method according to claim 2, further comprising:

controlling torque output of a front axle drive motor and a rear axle drive motor of the vehicle in a case that the current actual slip rate is out of the slip rate threshold range; and repeatedly executing calculating the current actual slip rate of the vehicle according to the current vehicle velocity of the vehicle and controlling the torque output of the front axle drive motor and the rear axle drive motor of the vehicle until the current actual slip rate is in the slip rate threshold range, and determining the target drift parameter according to the steering information and the current vehicle velocity of the vehicle.

4. The vehicle drift control method according to claim 2, wherein the target drift parameter further comprises at least one of a target rear axle side slip angle, a target front axle slip rate, a target rear axle slip rate or a target wheel velocity.

5. The vehicle drift control method according to claim 1, wherein controlling the vehicle to drift according to the front axle torque, the rear axle torque and the rear wheel brake torque comprises:

controlling a front axle drive motor of the vehicle to provide the front axle torque for a front wheel, controlling a rear axle drive motor of the vehicle to provide the rear axle torque for a rear wheel, and controlling a brake system of the vehicle to provide the rear wheel brake torque for the target rear wheel, so as to control the vehicle to drift.

6. The vehicle drift control method according to claim 1, before controlling the power-assisted steering motor to perform steering compensation according to the steering compensation quantity and the current vehicle velocity, the method further comprises:

calculating a steering angle difference between an actual steering angle in the steering information and a target steering angle in the target drift parameter; and determining that the steering angle difference is in a preset steering compensation threshold range.

7. The vehicle drift control method according to claim 6, further comprising:

selecting an extremum with a smaller first difference from the steering angle difference from the preset steering compensation threshold range to serve as a target extremum in a case of determining that the steering angle difference is not in the preset steering compensation threshold range;

calculating a second difference between the steering angle difference and the target extremum; and generating steering prompting information used for prompting a driver to perform steering operation according to a value of the second difference and plus or minus of the second difference, so as to prompt the driver to perform steering according to the steering prompting information until it is determined that the steering angle difference is in the preset steering compensation threshold range.

8. The vehicle drift control method according to claim 1, wherein determining the steering compensation quantity according to the current actual yaw rate of the vehicle and the target yaw rate comprises:

calculating an angular rate difference between the current actual yaw rate and the target yaw rate;

obtaining an integration angular rate by performing time integration on a product of the angular rate difference and an integration control sub-parameter in a PID closed-loop control;

obtaining a differential angular rate by calculating a product of the current actual yaw rate and a differential control sub-parameter in the PID closed-loop control;

obtaining a proportional angular rate by calculating a product of the angular rate difference and a proportional control sub-parameter in the PID closed-loop control; and obtaining the steering compensation quantity by calculating a sum of the proportional angular rate, the integration angular rate and the differential angular rate.

9. A vehicle, comprising:

a processor; and a memory configured to store an executable instruction of the first processor; wherein the processor is configured to:

acquire a slip rate level and steering information of the vehicle in a drift mode;

determine a target drift parameter according to the slip rate level, the steering information and a current vehicle velocity of the vehicle, the target drift parameter comprises a target yaw rate;

determine a steering compensation quantity according to a current actual yaw rate of the vehicle and the target yaw rate;

determine front axle torque, rear axle torque and rear wheel brake torque of the vehicle according to the steering compensation quantity and the steering information; and control the vehicle to drift according to the front axle torque, the rear axle torque and the rear wheel brake torque, and control a power-assisted steering motor to perform steering compensation according to the steering compensation quantity and the current vehicle velocity in the drift mode, wherein the steering information comprises an actual steering angle and a steering direction, the target drift parameter comprises a target wheel velocity, and the processor is further configured to:

determine the front axle torque and the rear axle torque of the vehicle according to the steering compensation quantity and the actual steering angle, take a rear wheel of the vehicle currently located on a drift inner side as a target rear wheel according to the steering direction, and determine the rear wheel brake torque for the target rear wheel according to a current wheel velocity of the vehicle and the target wheel velocity.

10. The vehicle according to claim 9, wherein the processor is further configured to:

determine a slip rate threshold range of each wheel of the vehicle according to the slip rate level;

calculate a current actual slip rate of the vehicle according to the current vehicle velocity of the vehicle; and determine the target drift parameter according to the steering information and the current vehicle velocity of the vehicle in a case that the current actual slip rate is in the slip rate threshold range.

11. The vehicle according to claim 10, wherein the processor is further configured to:

control torque output of a front axle drive motor and a rear axle drive motor of the vehicle in a case that the current actual slip rate is out of the slip rate threshold range; and repeatedly execute calculating the current actual slip rate of the vehicle according to the current vehicle velocity of the vehicle and controlling the torque output of the front axle drive motor and the rear axle drive motor of the vehicle until the current actual slip rate is in the slip rate threshold range, and determine the target drift parameter according to the steering information and the current vehicle velocity of the vehicle.

12. The vehicle according to claim 10, wherein the target drift parameter further comprises at least one of a target rear axle side slip angle, a target front axle slip rate, a target rear axle slip rate or a target wheel velocity.

13. The vehicle according to claim 9, wherein the processor is further configured to:

control a front axle drive motor of the vehicle to provide the front axle torque for a front wheel, control a rear axle drive motor of the vehicle to provide the rear axle torque for a rear wheel, and control a brake system of the vehicle to provide the rear wheel brake torque for the target rear wheel, so as to control the vehicle to drift.

14. The vehicle according to claim 9, wherein the processor is further configured to:

calculate a steering angle difference between the actual steering angle in the steering information and the target steering angle in the target drift parameter before controlling the power-assisted steering motor to perform steering compensation according to the steering compensation quantity and the current vehicle velocity; and determine that the steering angle difference is in a preset steering compensation threshold range.

15. The vehicle according to claim 14, wherein the processor is further configured to:

select an extremum with a smaller first difference from the steering angle difference from the preset steering compensation threshold range to serve as a target extremum in a case of determining that the steering angle difference is not in the preset steering compensation threshold range;

calculate a second difference between the steering angle difference and the target extremum; and generate steering prompting information used for prompting a driver to perform steering operation according to a value of the second difference and plus or minus of the second difference, so as to prompt the driver to perform steering according to the steering prompting information until it is determined that the steering angle difference is in the preset steering compensation threshold range.

16. The vehicle according to claim 9, wherein the processor is further configured to:

calculate an angular rate difference between the current actual yaw rate and the target yaw rate;

obtain an integration angular rate by performing time integration on a product of the angular rate difference and an integration control sub-parameter in a PID closed-loop control;

obtain a differential angular rate by calculating a product of the current actual yaw rate and a differential control sub-parameter in the PID closed-loop control;

obtain a proportional angular rate by calculating a product of the angular rate difference and a proportional control sub-parameter in the PID closed-loop control; and obtain the steering compensation quantity by calculating a sum of the proportional angular rate, the integration angular rate and the differential angular rate.

17. A non-transitory computer readable storage medium storing computer program instructions for controlling a drift of a vehicle, the computer program instructions when executed by a processor, cause the processor to execute a method comprising:

acquiring a slip rate level and steering information of the vehicle in a drift mode;

determining a target drift parameter according to the slip rate level, the steering information and a current vehicle velocity of the vehicle, the target drift parameter comprises a target yaw rate;

determining a steering compensation quantity according to a current actual yaw rate of the vehicle and the target yaw rate;

determining front axle torque, rear axle torque and rear wheel brake torque of the vehicle according to the steering compensation quantity and the steering information; and controlling the vehicle to drift according to the front axle torque, the rear axle torque and the rear wheel brake torque, and controlling a power-assisted steering motor to perform steering compensation according to the steering compensation quantity and the current vehicle velocity in the drift mode, wherein the steering information comprises an actual steering angle and a steering direction, the target drift parameter comprises a target wheel velocity, and determining the front axle torque, the rear axle torque and the rear wheel brake torque of the vehicle according to the steering compensation quantity and the steering information comprises:
- determining the front axle torque and the rear axle torque of the vehicle according to the steering compensation quantity and the actual steering angle,
- taking a rear wheel of the vehicle currently located on a drift inner side as a target rear wheel according to the steering direction, and
- determining the rear wheel brake torque for the target rear wheel according to a current wheel velocity of the vehicle and the target wheel velocity.

18. A chip, comprising:
an interface; and
a processor that is communicatively coupled to the interface, wherein the processor is configured to execute a vehicle control method comprising:
- acquiring a slip rate level and steering information of a vehicle in a drift mode;
- determining a target drift parameter according to the slip rate level, the steering information and a current vehicle velocity of the vehicle, the target drift parameter comprises a target yaw rate;
- determining a steering compensation quantity according to a current actual yaw rate of the vehicle and the target yaw rate;
- determining front axle torque, rear axle torque and rear wheel brake torque of the vehicle according to the steering compensation quantity and the steering information; and
- controlling the vehicle to drift according to the front axle torque, the rear axle torque and the rear wheel brake torque, and controlling a power-assisted steering motor to perform steering compensation according to the steering compensation quantity and the current vehicle velocity in the drift mode, wherein the steering information comprises an actual steering angle and a steering direction, the target drift parameter comprises a target wheel velocity, and determining the front axle torque, the rear axle torque and the rear wheel brake torque of the vehicle according to the steering compensation quantity and the steering information comprises:
- determining the front axle torque and the rear axle torque of the vehicle according to the steering compensation quantity and the actual steering angle,
- taking a rear wheel of the vehicle currently located on a drift inner side as a target rear wheel according to the steering direction, and
- determining the rear wheel brake torque for the target rear wheel according to a current wheel velocity of the vehicle and the target wheel velocity.

* * * * *

UNITED STATES PATENT AND TRADEMARK OFFICE
CERTIFICATE OF CORRECTION

| | | |
|---|---|---|
| PATENT NO. | : 12,365,385 B2 | Page 1 of 1 |
| APPLICATION NO. | : 18/326641 | |
| DATED | : July 22, 2025 | |
| INVENTOR(S) | : Xingchen Zhou | |

It is certified that error appears in the above-identified patent and that said Letters Patent is hereby corrected as shown below:

In the Specification
In Column 4, Lines 51-52, delete "proportional integral differential (PID)" and insert
-- proportional–integral–derivative (PID) --, therefor.
In Column 5, Line 12, delete "$dMz=\Delta Yawrate \times P++\int 0t \Delta Yawrate \times I \times dt + Yawrate \times D$" and insert
-- $dMz=\Delta Yawrate \times P + \int 0t \Delta Yawrate \times I \times dt + Yawrate \times D$ --, therefor.
In Column 7, Line 62, delete "than –3°, and" and insert -- than –3° and --, therefor.

In the Claims
In Column 14, Line 60, in Claim 9, delete "the first processor; wherein" and insert -- the processor; wherein --, therefor.

Signed and Sealed this
Thirtieth Day of September, 2025

John A. Squires
*Director of the United States Patent and Trademark Office*